United States Patent [19]
Zamboni

[11] 3,835,500
[45] Sept. 17, 1974

[54] WATER REMOVAL MACHINE FOR ARTIFICIAL TURF

[75] Inventor: Frank J. Zamboni, Paramount, Calif.

[73] Assignee: Frank J. Zamboni & Co., Paramount, Calif.

[22] Filed: Jan. 29, 1973

[21] Appl. No.: 327,770

Related U.S. Application Data

[62] Division of Ser. No. 195,790, Nov. 4, 1971, Pat. No. 3,736,619.

[52] U.S. Cl. .............................................. 15/319
[51] Int. Cl. ............................................ A47l 5/00
[58] Field of Search .......... 15/319, 339; 417/40, 41; 15/320, 340

[56] References Cited
UNITED STATES PATENTS

| | | | |
|---|---|---|---|
| 3,351,971 | 11/1967 | Hocking et al. | 15/340 |
| 3,442,219 | 5/1969 | Fitzgerald | 417/40 X |
| 3,683,447 | 8/1972 | Stevenson | 15/320 X |
| 3,684,400 | 8/1972 | Einerson | 417/40 |

Primary Examiner—Harvey C. Hornsby
Assistant Examiner—C. K. Moore
Attorney, Agent, or Firm—Herbert E. Kidder

[57] ABSTRACT

A machine for removing standing water from artifical turf, comprising an automotive vehicle carrying air and water pumps, air/water separation tank, nozzles, and associated equipment, and having a transverse water pick-up device including a roller that rolls on the turf and piles up a wave of water ahead of it. The roller is enclosed within a narrow, elongated housing having top, front and rear walls, and end plates. The bottom edge of the front wall just clears the turf and forms a narrow gap through which the piled up water flows into the housing ahead of the roller, where it is picked up by the vacuum suction and carried through a plurality of hoses to the tank. Here, the water is separated from the air and is pumped in a high-velocity jet to one side of the machine or the other, so that on successive passes over the turf, the machine moves all of the water to one side of the playing field where it can be drained off. The bottom edge of the rear housing wall extends slightly down into the turf and bends the pile forwardly, then releases it to flip droplets of water into the air behind the rear wall, where they are picked up by the air stream and carried through openings in the rear wall into the housing and thence through the hoses into the tank. An apron extends rearwardly from the rear wall, forming a confined space behind the housing, into which water droplets are flipped up by the turf. The trailing bottom edge of the apron rests lightly on the top of the turf, causing air to be sucked under the bottom edge of the apron and through the turf, to help pick up any remaining water.

2 Claims, 7 Drawing Figures

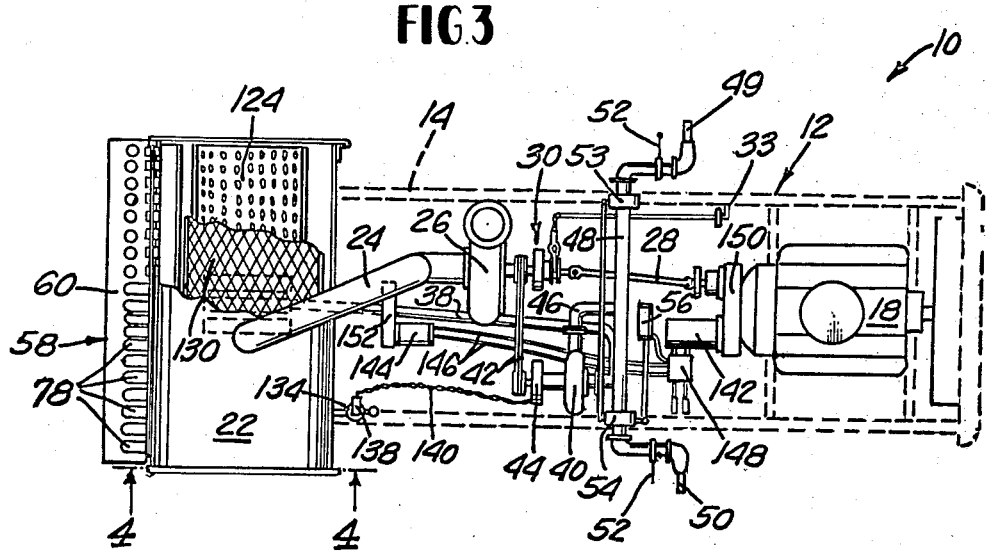
FIG. 3
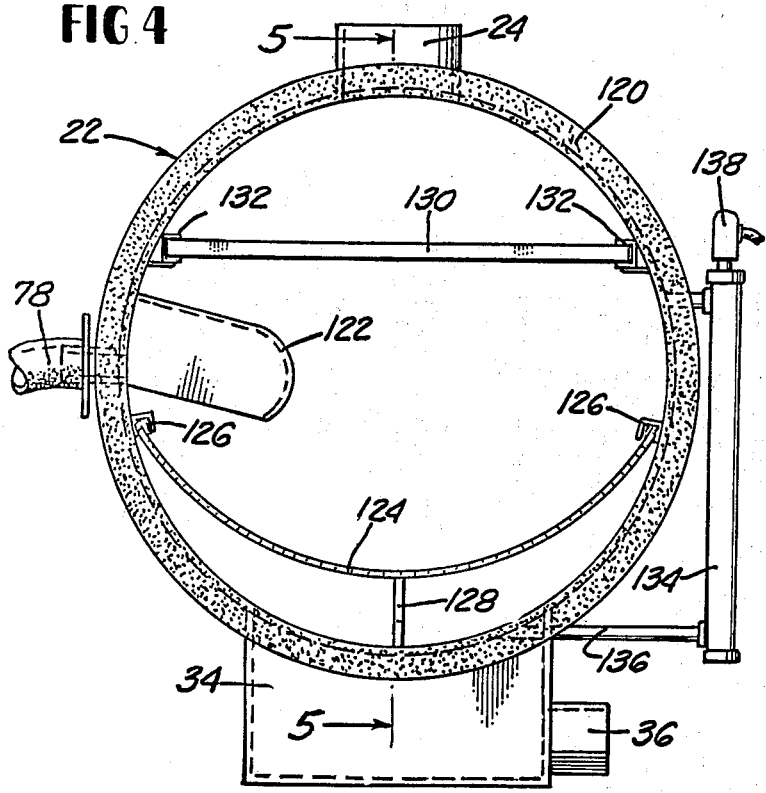
FIG. 4
FIG. 5

WATER REMOVAL MACHINE FOR ARTIFICIAL TURF

CROSS-REFERENCE TO RELATED APPLICATIONS:

This application is a division of my pending application Ser. No. 195,790, filed Nov. 4, 1971, now U.S. Pat. No. 3,736,619, issued June 5, 1973.

BACKGROUND OF THE INVENTION:

The present invention pertains to a new and unique machine for removing standing water from artificial turf, which is widely used on athletic fields where certain sporting events, such as baseball, football, soccer, and the like are held. The invention is particularly useful in the case of commercial stadiums where the spectators pay admission fees, and where a great deal of money may be lost if the game is cancelled or called off before a certain minimum length of play owing to excessive water on the field caused by a sudden downpour. Some games continue to be played, regardless of falling rain or standing water, but others, of which baseball is the best example, are called off if the rainfall or standing water makes play impossible.

Before the advent of artificial turf, the natural turf could absorb a great deal of rainfall before standing water became a problem. This was due to the porous, absorbent nature of the soil and the wick-like action of the grass roots. However, artifical turf is an entirely non-porous, non-absorbent material, laid down on a pavement-like substrate, and any rain-fall almost immediately produces standing water. The playing fields are carefully levelled before laying down the artificial turf, and there is so little slope that there is very little natural drainage. Drainage trenches are provided around the edges of the playing field to carry off the standing water, but the problem is to get the flat sheet of standing water over to the drainage ditches.

One factor complicating the problem of water removal is the relatively low load-carrying capacity of artificial turf. The maximum tire loading for artificial turf is usually considered to be aboutt 30 pounds per square inch, which precludes the use of tank-carrying automotive vehicles to pick up the water and carry it off the field, as a tank truck filled with water would have a tire loading considerably in excess of 30 psi. Another factor that must be taken into account is that the water removal machine should be capable of removing all standing water from a baseball field in not more than about 45 minutes, so that play can begin or be resumed without excessive delay.

SUMMARY OF THE INVENTION:

The primary object of the invention is to provide a new and improved water removal machine capable of removing standing water from an artificial turf playing field in the minimum of time, and without exceeding the maximum allowable tire loading on the turf.

Another object of the invention is to provide an improved vacuum pickup head for a machine of the class described, which does an exceptionally effective job of picking up the free standing water, and also removing excess water clinging to the turf.

These objects are achieved in the present invention by means of a new and unique automotive vehicle, which includes a roller, or its equivalent, that rolls up a wave of water ahead of it as the machine moves forwardly, and this wave of water is sucked up by the machine and carried to a separator tank, where the air and water are separated. The water drops to the bottom of the tank, where it is sucked up by a water pump and thrown off to one side of the machine by a jet nozzle. As the machine travels back and forth across the field, working gradually toward one side thereof, the standing water is picked up and thrown toward said one side, until finally the water is worked over to said one side and is carried off through drainage trenches. The vacuum pickup head is also designed and constructed so as to bend the turf strands down as the machine moves forwardly and then release the strands so that they flip droplets of water into the air, where they are picked up by the airstream and carried away. After removing the excess standing water, the vacuum pickup head also draws air horizontally through the wet turf before the air enters the pickup head, and in so doing removes any water clinging to the strands of the turf. In this way, the machine removes most of the water on the turf, and the average baseball field can be restored to play in less than 45 minutes.

The foregoing and other objects and advantages of the invention will become apparent to those skilled in the art from the following detailed description of the preferred embodiment thereof, with reference to the accompanying drawings.

BRIEF DESCRIPTION OF THE DRAWINGS:

FIG. 3 is a somewhat schematic top plan view of the machine, with portions removed to show the essential mechanisms;

FIG. 4 is a fragmentary side elevation, taken at 4—4 in FIG. 3, and drawn to an enlarged scale, looking into the interior of the air-water separation tank through one open end thereof;

FIG. 5 is a transverse vertical section through one end of the tank, taken at 5—5 in FIG. 4;

Figure 1:
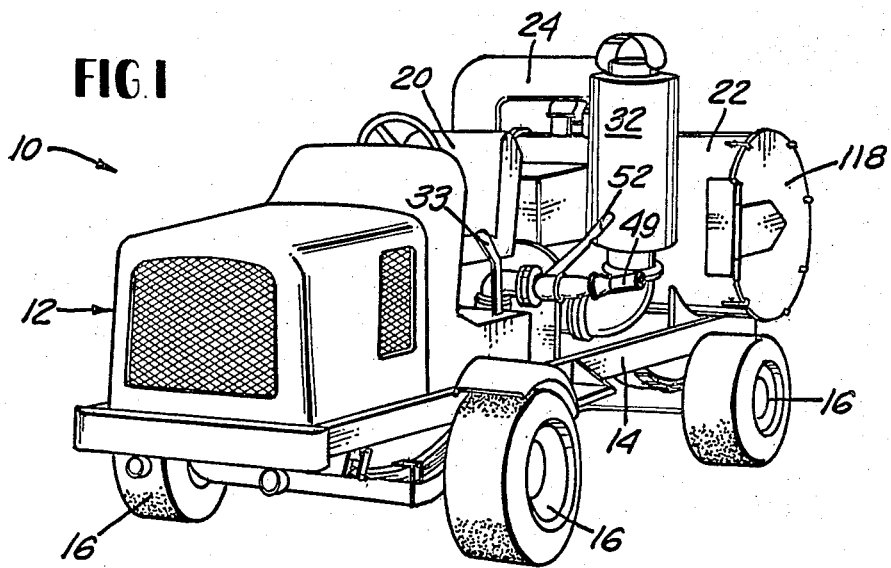
FIG. 1 is a perspective front view of a machine embodying the principles of the invention.

DESCRIPTION OF THE PREFERRED EMBODIMENT:

In the drawings, the apparatus of the invention is designated in its entirety by the reference numeral 10, and comprises an automotive vehicle 12, consisting of a frame 14 supported by wheels 16 and powered by an internal combustion engine 18. Mounted on the frame 14 behind the engine compartment is the driver's seat 20, with the usual complement of controls for operating the machinery and steering the wheels.

Mounted transversely on the frame 14 near the rear end thereof is a cylindrical air/water separation tank 22. Connected to the top of tank 22 is a large-diameter pipe 24 which goes to the intake of a blower 26. Blower 26 is a large-capacity centrifugal blower, preferably capable of delivering about 1600 cubic feet per minute, or more, under full load, and this is driven from the engine 18 through a drive shaft 28 and mechanical clutch 30. The blower discharges to atmosphere through a muffler 32. Clutch 30 is actuated by a control lever 33 and suitable connecting linkage.

At the bottom of the tank 22 is a box-like sump 34 into which the water in the tank drains, and on the front side of the sump near the bottom thereof is an outlet 36 (FIG. 4) to which a pipe 38 is connected. Pipe 38 extends forwardly from the sump, and its other end is connected to the intake of a water pump 40. Pump 40 is preferably capable of pumping 400–450 or more gallons per minute, and is driven from the rotor shaft of the blower 26 by belts 42 trained around pulleys on blower shaft and pump impeller shaft. An electric clutch 44 on the impeller shaft of the water pump enables the latter to be driven or stopped at will, as long as the rotor shaft of blower 26 is running.

The outlet of the water pump 40 is connected by a pipe 46 to a transversely extending manifold pipe 48. At opposite ends of the manifold pipe 48 are discharge nozzles 49 and 50, which are directed laterally outward from the vehicle. The nozzles 49, 50 are swivelled for turning movement in a transverse vertical plane, and each nozzle has a handle 52, by which it can be turned to the desired angle. Butterfly valves at 53 and 54 direct the water in manifold 48 to one or the other of nozzles 49, 50, and these butterfly valves are simultaneously actuated by a hydraulic cylinder 56 and connecting linkage.

Figure 2:
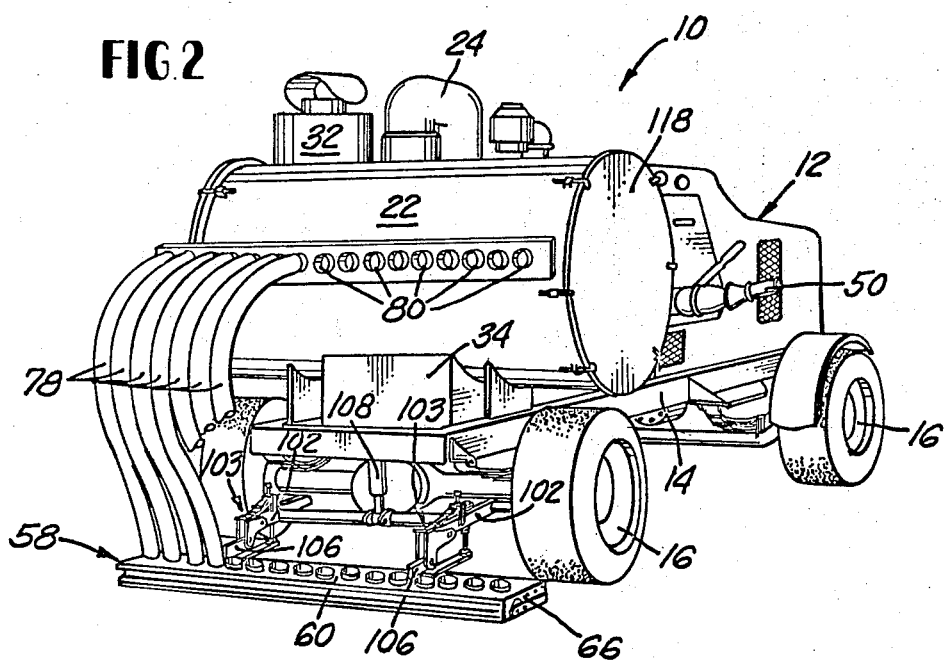
FIG. 2 is another perspective view of the same, as seen from the rear, with some of the vacuum hoses removed or cut away to show portions of the mechanism more clearly.
Figure 6:
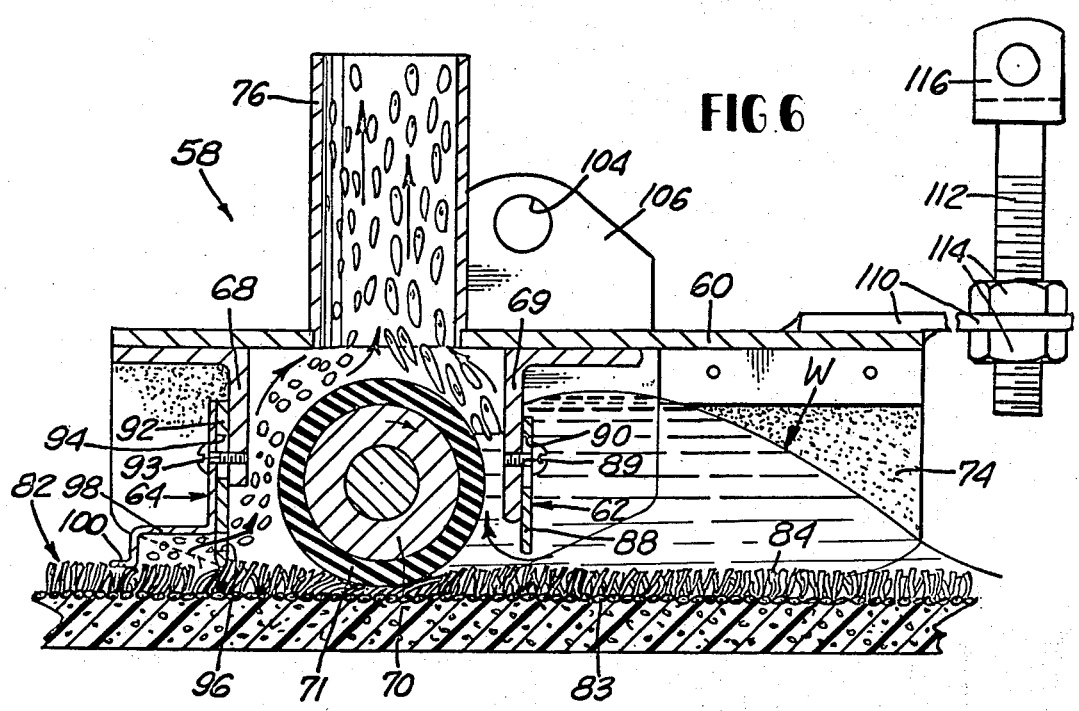
FIG. 6 is a sectional view through the vacuum pickup head.
Figure 7:
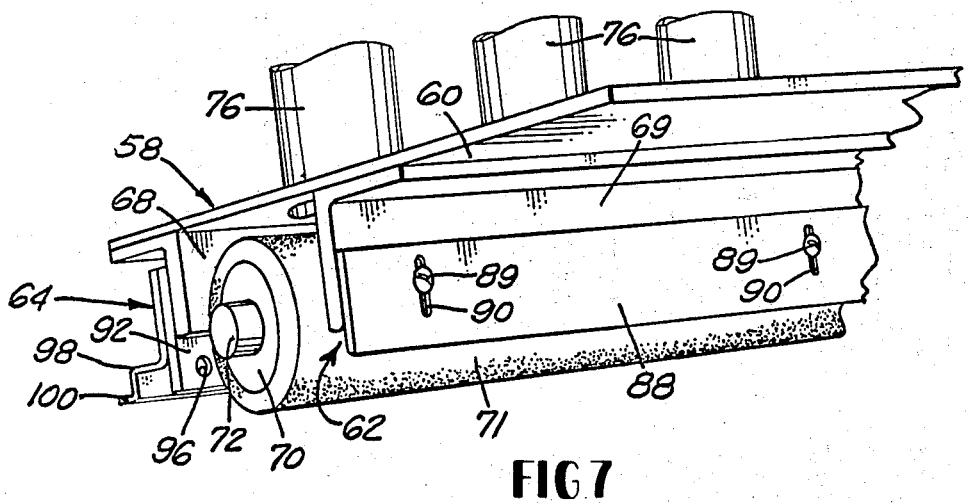
FIG. 7 is a fragmentary perspective view of one end of the vacuum pickup head, as seen from below, with the near end plate removed so that the end of the roller can be seen.

Mounted at the rear of the vehicle 12 and sliding on the ground is a vacuum pickup head 58. Pickup head 58 consists of a narrow, elongated housing made up of a top plate 60, front wall 62, rear wall 64, and end plates 66 (FIG. 2). The housing is thus open at the bottom, as seen in FIGS. 6 and 7, and this open bottom is located in close proximity to the top of the turf. The front and rear walls 62, 64, are formed, in part, by opposed angle irons 68 and 69, each of which has one flange welded to the underside of plate 60. The vertical flanges of angle irons 68, 69 are spaced apart about four inches, and disposed within the space between them is a roller 70. Roller 70 has a tire 71 of soft rubber, or other elastomer, bonded onto its outer surface, and projecting from the ends of the roller are stub axles 72, which are journaled in bearings (not shown) mounted on the end plates 66. As best shown in FIG. 6, the two angle irons 68, 69 are mounted on the rearward portion of the top plate 60, and this leaves a considerable portion of the plate projecting forwardly from the front wall 62, the purpose of which will become apparent presently. End plates 66 include half-inch thick rubber plates 74, which extend all the way forwardly to the front edge of top plate 60, and the bottom edges of the plates 74 slide on the turf. The purpose of the rubber plates 74 is to confine the wave of water which is piled up ahead of the roller 70, 71 and front wall 62, and to keep the wave from running out around both ends of the housing.

Fixed to the top side of top plate 60 at uniformly spaced intervals along the length thereof are short lengths of tubing 76, forming nipples over which the ends of rubber hoses 78 are inserted. Hoses 78 extend upwardly from the vacuum pickup head 58, and their upper ends are inserted over nipples 80 projecting rearwardly from the back side of tank 22. Hoses 78 thus connect the vacuum pickup head 58 to the tank 22, and when the latter is evacuated by the blower 26, the vacuum pressure is obtained also in the pickup head. Preferably, the sum total of the cross-sectional areas of the hoses 78 is substantially the same as the cross-sectional area of the intake for blower 26, and the reason for this is to ensure that the velocity of airflow in the hoses will be high enough to carry the heavy weight of water along on the airstream, without overloading the blower. In the embodiment shown in FIG. 2, there are 16 hoses, and the capacity of the blower is 1,600 cfm. This means that each hose 78 is carrying 100 cfm of air, and with each hose having an inside diameter of 2 inches, the velocity of the airstream is approximately 4,000 feet per minute. The sum total of the cross-sectional areas of the 16 hoses is approximately 50 square inches, and this is substantially the same area as the blower intake when the latter is 8 inches in diameter. These figures are not extremely critical, but represent an optimum condition that produces maximum velocity of the airstream in the hoses 78 for a given input to the blower.

FIG. 6 shows approximately what artificial turf is like in cross-section. The turf is designated by the reference numeral 82 and comprises a woven, fabric-like backing 83 of plastic, having a thick mat 84 of upstanding plastic strands about one-half inch long, which are colored green to resemble blades of grass. Bonded to the underside of the backing 83 is a substrate panel 86 of high-density plastic foam, the said panel usually being about three-quarters of an inch thick. The panels of artificial turf are laid down on a pavement-like base and are all adhered thereto with an adhesive. Other forms of artificial turf may vary somewhat from the form shown and described herein, but all of them are characterized by a dense mat of strands resembling grass turf, and a base that is non-absorbent and resistant to penetration by water. Consequently, all forms of artificial turf are subject to flooding whenever there is any rainfall.

FIG. 6 also shows a wave W of water piled up ahead of the pickup head as a result of the forward movement of the machine. The roller 70, 71 presses down against the turf 82 and flattens the mat 84. This prevents water from getting under the roller, and acts in the same manner as a squeegee, causing the water to be swept forwardly and to pile up in a wave W. The overhanging forward portion of the top plate 60 prevents the wave of water from going up over the top of the housing when there is a great deal of standing water on the turf, or when the machine is traveling too fast, and the rubber end plates 74 prevent the piled-up water from running out at the ends.

The front wall 62 is made up of two parts: the downwardly extending flange of angle iron 69, and a vertically adjustable strip 88 which is secured to the front side of the angle iron flange by screws 89 that pass through elongated vertical slots 90 in the strip. Strip 88 is adjusted verticaly so that its bottom edge clears the top of the mat 84 by one-quarter to one-half inch, leaving a gap through which the piled-up water of wave W runs into the interior of the pickup head housing to fill the space between the front of the roller 70, 71 and the front wall 62. Inside the housing, the water is picked up by the suction produced by blower 26, and is carried through hoses 78 to the tank 22.

The rear wall 64 is likewise made up of two parts: the downwardly extending flange of angle iron 68, and a vertically movable strip 92, which is secured to the back side of the angle iron flange by screws 93 that pass through elongated slots 94 in the strip. Strip 92 is adjusted vertically so that its bottom edge protrudes slightly down into the mat 84 of the turf. As a result, forward movement of the machine causes the bottom edge of strip 92 to bend the strands of mat 84 forwardly, and then release them. This flips droplets of water from the strands into the air directly behind plate 92. A plurality of uniformly spaced holes 96 are provided in strip 92 near the botto edge thereof, and air is drawn in through these holes, into the interior of the housing, carrying with it the droplets of water flipped up by the strands of turf as they are released.

The airspace directly behind the holes 96 is enclosed by an apron 98 having a flange that lies flat against the back side of plate 92 and is secured thereto by scres 93. Aprong 98 extends horizontally rearward from the strip 92 just above the holes 96, and its rear end is bent downwardly to the top surface of the mat 84, and then horizontally again at 100 to lie flat against the top surface of the mat. The apron is closed at its ends, and thus encloses the airspace behind the bottom edge of strip 92, into which the droplets of water are flipped by the turf strands. The horizontal foot portion 100 of the apron lies flat against the top of the turf, and this forces the air to flow under the foot 100 and horizontally through the mat 84 for a short distance before entering the space enclosed by the apron 98. In flowing horizontally through the mat 84, the high-velocity airstream strips away any water clinging to the strands, and leaves the turf damp but otherwise free from standing water.

The vacuum pickup head 58 is carried behind the vehicle 12 on two draft arms 102, which are pivotally connected at their front ends to the vehicle frame for vertical swinging movement. At their rear ends, the draft arms 102 are connected to the pickup head 58 by a spring-loading mechanism 103 of the type shown and described in my U.S. Pat. No. 3,622,205. The said spring-loading mechanism is connected to the pickup head 58 by means of pivot bolts passed through holes 104 in ears 106 projecting upwardly from the top plate 60. A hydraulic cylinder 108 is connected to the draft arms in such a manner that operation of the cylinder causes the pickup head to be raised up from the ground for transport.

To adjust the angularity of the pickup head about the pivot axis of the bolts in holes 104, there are two strips 110 of steel welded to the top of plate 60 directly ahead of ears 106, and holes are provided in the front ends of these strips, through which bolts 112 pass. Nuts 114 are screwed onto the bolts 112 above and below the strip 110, and these provide adjustment of the position of the strips along the length of the bolts. A U-shaped yoke 116 is fixed to the top end of each of the bolts 112, and this yoke is attached by a bolt to the draft arm 102. When it is desired to raise the front housing wall 62 and lower the rear wall 64 with respect to the roller 70, 71, this can be done quickly and easily by backing off the top nut 114 and advancing the bottom nut.

The air/water separator tank 22 is a fairly large, cylindrical tank having end closures 118 that are clamped tightly to the tank, against rubber gasket seals 120 (FIG. 5). Inside the tank on the rear wall thereof is a deflector 122, which takes the direct impact of the high velocity streams of air entering the tank through the hoses 78, and deflects the air downwardly. Extending arcuately across the bottom of the tank is a cylindrically curved trash screen 124, the edges of which are held in channels 126 on opposite sides of the tank. At its midpoint, the screen 124 rests on a vertical baffle plate 128, which extends lengthwise of the tank along the bottom thereof. Baffle 128 reduces surging of the water in the tank as the machine travels over irregularities in the ground.

Extending horizontally across the tank from one side to the other a short distance above the deflector 122 is a filter screen 130, which separates spray and small droplets of water from the air before the latter goes to the blower 26. Filter screen 130 may conveniently be made by sandwiching a layer of 50-mesh porous foam rubber between two sheets of expanded metal. The sandwich thus formed is then held along its edges by channels 132, which are fixed to the walls of the tank. As the air enters tank 22 from hoses 78, its velocity is greatly reduced, and this allows the filter 130 to pick up the water droplets that are carried by the airstream, and drop the water back into the tank. The air, free of water droplets, after passing through filter 130, leaves the tank through pipe 24 to go on to the blower 26, and thence to the atmosphere.

Water carried into the tank 22 by the airstream falls through the screen 124 and drops into the sump 34, where it is drawn off and discharged through nozzles 49 and 50 by water pump 40. The operation of the pump 40 is controlled by the water level within the tank 22, and this is accomplished by means of magnetic floats contained within a float chamber 134 mounted on the front of the tank. Float chamber 134 comprises a vertical pipe, which is connected at the bottom end by a pipe 136 to the bottom of the tank. The top end of float chamber 134 is vented into the tank. Mounted on top of the float chamber is a switch mechanism 138, which is actuated by the magnetic floats within the float chamber, and the switch mechanism is connected by wires 140 to the electric clutch 44 in the power train to water pump 100. When the water level in tank 22 falls below a predetermined minimum level, the switch mechanism 138 opens the clutch 44, and stops the water pump 40. When the water level rises above a second predetermined level, switch 138 closes the clutch 44, and the water pump 40 runs. If the water should reach a third predetermined level, switch 138 causes a horn to sound, warning the operator that the tank is becoming filled beyond the safe operating level, and that the machine should be slowed down. At a fourth water level, switch 138 cuts out the ignition to the engine 18, stopping the machine before any damage can be done.

Power for propelling the vehicle 12 over the turf is derived from the engine 18, and this is preferably utilized by means of a hydrostatic pump 142 and motor 144, which are connected by flexible hoses 146 and control valves 148. The hydrostatic pump 142 is driven by one drive shaft of a dual output gear box 150, the outer shaft being used to drive the blower 26 and water pump 40. Hydrostatic motor 144 drives a gear box 152, the output shaft of which is connected to the differential gears on the rear axle of the vehicle. The vehicle 12 may be a two wheel or a four wheel drive, and if the latter, the differential gears of the front axle would also be driven from gear box 152. A pair of laterally projecting control levers on the control valve mechanism 148 allows the operator to control the direction and speed of forward movement of the vehicle. The chief advantage of the hydrostatic drive is that it provides infinitely variable speed for driving the vehicle, without requiring any change in the speed of the engine 18, which must run at a sufficiently high speed to deliver the power required for driving the blower and pump, as well as propelling the vehicle. Hydraulic pressure from the hydrostatic motor 142 also actuates the valve control cylinder 56 and hydraulic lift cylinder 108.

The operation of the invention is believed to be self-evident from the foregoing description, and will be only briefly summarized here. As the machine travels forwardly over the flooded turf at a speed of about 7 miles per hour, the roller 70, 71 of the vacuum pickup head causes a wave of water to be piled up ahead of it, and this piled-up water is sucked under the bottom edge of front housing wall 62 and drawn up through hoses 78 to the tank 22. Here, water is separated from the air and drops down into the sump 34, while the air is drawn out by blower 26 and exhausted to the atmosphere. The water in the sump 34 is picked up by the pump 40, and is thrown in a high-velocity jet through one of the other of nozzles 49, 50 for a distance of about 60 feet off to one side of the field. As the machine travels back and forth over the turf, it gradually works the water over to the side of the field, where the water runs off through drainage trenches.

Behind the roller 70, 71, the rear wall 64 bends the strands of turf down as the machine advances, and then releases them, causing the strands to flip droplets of water up into the airspace confined by apron 98. Here, the droplets are caught up by the airstream and carried through holes 96 into the interior of the vacuum pickup head. Air that is drawn into the space confined by apron 98 is sucked under the foot portion 100 of the apron, and in the process is drawn horizontally through the mat 84 under the foot. This strips any remaining water clinging to the strands of the turf, and the turf behind the pickup head is merely damp, with all free-standing water removed therefrom.

Water that is hurled to one side of the maching through nozzles 49, 50 remains more or less where it lands on the turf, as the turf provides considerable resistance to horizontal flow of the water over its surface. Thus, with each traverse of the machine over the field, the water in a swath about 8 feet wide is thrown about 60 feet off to one side, and on the return trip, the next adjacent 8-foot wide swath is cleared of water, and the water likewise thrown 60 feet to the side. At a forward speed of 7 miles per hour, the machine can remove all of the standing water from the artificial turf of an average baseball field is less than 45 minutes, and play begin or be resumed.

While I have shown and described in considerable detail what I believe to be the preferred form of my invention, it will be understood by those skilled in the art that various changes may be made without departing from the scope of the claims that follow.

I claim:

1. Apparatus for removing standing water from an artifical turf playing field, comprising:
    an automotive vehicle having an engine, an air/water separation tank, a blower having its intake connected to the upper portion of said tank, a water pump having its intake connected to the bottom of said tank, a vacuum pickup head, conduit means connecting said vacuum pickup head to said tank, power transmission systems for driving said blower and water pump, and discharge nozzle means connected to the outlet of said water pump for throwing a stream of water to one side of the machine;

said vacuum pickup head comprising an elongated housing disposed in close proximity to said turf and extending transverse to the direction of forward travel, said housing having front and rear walls, a top plate, and end plates, and further including means within said housing pressing downwardly against said turf and pushing a wave of water ahead of it as the machine moves forwardly;

said front housing wall having its bottom edge raised slightly above the surface of the turf so that the water is able to pass under it and into the housing, the vacuum in said housing due to suction of said blower causing the water to be carried up through said conduit means to said tank;

said rear housing wall having its bottom edge extending down at least to said turf, and having openings through which air passes into said housing and is drawn up said conduit means to said tank and thence to said blower;

said end plates confining said wave of water at the ends of said housing;

said power transmission system driving said water pump having a clutch; and means resonsive to changes in the water level in said tank for engaging said clutch when the water level rises above a predetermined upper level, and for disengaging said clutch when the water level falls below a second predetermined lower level.

2. Apparatus for removing standing water from an artificial turf playing field, comprising:
    a vehicle having an engine, an air/water separation tank, a blower having its intake connected to the upper portion of said tank, a water pump having its intake connected to the bottom of said tank, a vacuum pickup head, conduit means connecting said vacuum pickup head to said tank, power transmission means for driving said blower and water pump from said engine, including a clutch in the drive to said water pump, and discharge nozzle means connected to the outlet of said water pump for throwing a strem of water to one side of the machine;

means responsive to changes in the water level in said tank for engaging said clutch when the water rises above a predetermined upper level, and for disengaging said clutch when the water falls below a second predetermined level;

said vacuum pickup head comprising an elongated housing disposed in close proximity to said turf and extending transverse to the direction of forward travel, said housing having front and rear walls, a top plate, and end plates;

a roller rotatably supported within said housing and pressing downwardly against said turf so as to push a wave of water ahead of it as the machine moves forwardly;

said front housing wall having its bottom edge raised slightly above the surface of the turf so that the water is able to pass under it and into the housing, where the vacuum due to suction of said blower causes the water to be carried up through said conduit means to said tank;

said rear housing wall extending down to close proximity with said turf, whereby air can be sucked into said housing under the bottom edge of said rear wall and drawn up said conduit means to said tank and thence to said blower; and said end plates confining said wave of water at the ends of said housing.

* * * * *